(12) United States Patent
Sakamoto et al.

(10) Patent No.: US 11,931,769 B2
(45) Date of Patent: Mar. 19, 2024

(54) METHOD OF APPLYING HEAT SHIELD MATERIAL TO PISTON

(71) Applicant: Mazda Motor Corporation, Hiroshima (JP)

(72) Inventors: Ken Sakamoto, Aki-gun (JP); Masaya Minato, Aki-gun (JP); Tsutomu Shigenaga, Aki-gun (JP); Chiaki Asano, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/897,063

(22) Filed: Aug. 26, 2022

(65) Prior Publication Data
US 2023/0099537 A1    Mar. 30, 2023

(30) Foreign Application Priority Data

Sep. 28, 2021    (JP) ................... 2021-157874

(51) Int. Cl.
| | | |
|---|---|---|
| *B05D 1/00* | (2006.01) | |
| *B05D 1/02* | (2006.01) | |
| *B05D 7/14* | (2006.01) | |
| B05B 13/04 | (2006.01) | |
| F16J 10/02 | (2006.01) | |

(52) U.S. Cl.
CPC ............... *B05D 1/005* (2013.01); *B05D 1/02* (2013.01); *B05D 7/14* (2013.01); *B05B 13/0431* (2013.01); *F16J 10/02* (2013.01)

(58) Field of Classification Search
CPC ............................. B05B 13/0431; F16J 10/02
See application file for complete search history.

(56) References Cited

U.S. PATENT DOCUMENTS

| | | | | |
|---|---|---|---|---|
| 5,079,043 A | * | 1/1992 | Lambert | ................... C23C 4/12 |
| | | | | 427/427 |
| 2018/0252179 A1 | * | 9/2018 | Iguma | ....................... F02F 1/24 |
| 2020/0011418 A1 | * | 1/2020 | Wagener | ................. F16J 10/04 |

FOREIGN PATENT DOCUMENTS

| | | | |
|---|---|---|---|
| JP | 2013177693 | * | 9/2013 |
| JP | 2013177693 A | | 9/2013 |

* cited by examiner

*Primary Examiner* — Nathan T Leong
(74) *Attorney, Agent, or Firm* — Alleman Hall & Tuttle LLP (57) ABSTRACT

A method of applying heat shield material to form a heat shield layer on a crown surface of a piston of an engine is provided. The method includes the steps of disposing a dispenser that linearly discharges the heat shield material toward the crown surface, and moving an applied position of the heat shield material with respect to the crown surface in a circumferential direction of the crown surface, while discharging the heat shield material from the dispenser toward the crown surface.

16 Claims, 7 Drawing Sheets

METHOD OF APPLYING HEAT SHIELD MATERIAL TO PISTON

TECHNICAL FIELD

The present disclosure relates to a method of applying heat shield material to a piston of an engine.

BACKGROUND OF THE DISCLOSURE

It is generally known that a heat shield layer is provided to a wall surface which forms a combustion chamber of an engine (a crown surface of a piston, a lower surface of a cylinder head, etc.) to reduce cooling loss of the engine and improve fuel efficiency. For example, JP2013-177693A discloses a method of forming a heat shield layer by applying a liquid heat shield material which is a mixture of hollow particles and a binder to the crown surface of the piston by using a paint spray gun, and calcinating the heat shield layer.

However, in spray painting, an amount of overspray, which is the heat shield material dispersed around the crown surface of the piston, increases. That is, the application efficiency of the heat shield material is poor. Further, spray dust from the overspray adheres to the side surface of the piston, and when the piston reciprocates, it damages the cylinder bore surface. In order to prevent the damage, it is necessary to mask the piston side surface, which lowers productivity (mass productivity).

SUMMARY OF THE DISCLOSURE

One purpose of the present disclosure is to improve application efficiency and productivity in application of a heat shield material to a crown surface of a piston.

In order to solve the above problems, the present disclosure utilizes a dispenser for the application of the heat shield material to the crown surface of the piston.

According to one aspect of the present disclosure, a method of applying a heat shield material is provided, which is to form a heat shield layer on a crown surface of a piston of an engine. The method includes the steps of disposing a dispenser that linearly discharges the heat shield material toward the crown surface, and moving an applied position of the heat shield material with respect to the crown surface in a circumferential direction of the crown surface, while discharging the heat shield material from the dispenser toward the crown surface.

Accordingly, unlike spray painting, the heat shield material is discharged linearly (a continuous-line manner or a dot-line manner) toward the piston crown surface without scattering from the dispenser, and thus, the heat shield material scattering around the crown surface is avoided. Therefore, the application efficiency of the heat shield material improves. Further, masking of a side surface of the piston can be simplified or the masking becomes unnecessary, which becomes advantageous to the improvement in productivity. Moreover, since the applied position of the heat shield material is moved in the circumferential direction of the crown surface, it becomes easier to form the heat shield layer even to the circumferential edge of the crown surface, without the heat shield material being extended outside of the crown surface.

The dispenser may be a paint dot gun that discharges dots of the heat shield material at a given interval. The dots of the heat shield material may spread and become continuous from each other in the circumferential direction of the crown surface. That is, by the applied position of the heat shield material with respect to the crown surface being moved in the circumferential direction of the crown surface, the dots of the heat shield material sequentially applied onto the crown surface are spread and connected with each other, and therefore, the heat shield layer which continues in the circumferential direction of the crown surface is formed.

For moving the applied position of the heat shield material in the circumferential direction of the crown surface, a method of rotating the piston on an axial center thereof while fixing the position of the dispenser, and a method of rotating the dispenser on the axial center of the piston while fixing the piston, can be adopted. Preferably, the former method (rotating the piston) is adopted. According to this configuration, since the dispenser is not moved, the straightness of the heat shield material which is discharged from the dispenser will not be disturbed. Therefore, the heat shield layer is more easily formed at a desired position and with a desired thickness on the piston crown surface.

The method may further include the step of, each time the applied position of the heat shield material moves in the circumferential direction around the top of the crown surface at least once, moving the applied position of the heat shield material with respect to the crown surface in the radial direction of the piston to form the heat shield layer on the crown surface, continuously in the radial direction.

Therefore, the heat shield layer is more easily formed on the piston crown surface, which is continuous in the radial direction of the piston.

The method may further include the steps of positioning the dispenser so that the applied position of the heat shield material with respect to the crown surface is in a circumferential edge part of the crown surface, and in this state, rotating the piston on the axial center thereof and starting the discharge of the heat shield material, and then, each time the piston completes a full rotation, moving the applied position of the heat shield material inwardly in the radial direction by a given amount.

By setting the start position of the application of the heat shield material with respect to the crown surface to the circumferential edge part of the crown surface, the adhesion of the heat shield material to the side surface of the piston is more easily prevented.

A discharge amount and a discharge frequency of the paint dot gun per shot may be set constant, and a rotational speed of the piston may be reduced as the applied position of the heat shield material moves inwardly in the radial direction.

Therefore, equalizing the thickness of the heat shield layer on the piston crown surface in the radial direction becomes easier.

A discharge amount of the paint dot gun per shot and a rotational speed of the piston may be set constant, and a discharge frequency of the paint dot gun may be reduced as the applied position of the heat shield material moves inwardly in the radial direction.

Therefore, equalizing the thickness of the heat shield layer on the piston crown surface in the radial direction becomes easier.

The crown surface may have a cavity in a center part, and a part around the cavity may be an annular flat part. The method may further include the steps of, for the annular flat part, forming the heat shield layer as a discharge direction of the heat shield material is oriented in the axial direction of the piston, by the dispenser, and then, spraying the heat shield material on an inner surface of the cavity by a paint spray gun to form the heat shield layer continuous from the annular flat part.

According to this configuration, since the heat shield material is applied for the annular flat part around the cavity by the dispenser with the discharge direction being oriented in the axial direction of the piston, the heat shield material can be applied efficiently. Further, since the dispenser painting is limited to the annular flat part and spray painting is limited to the inner surface of the cavity, scattering of the heat shield material around the crown surface is more easily avoided by spray painting. Further, although the cavity inner circumferential surface is the curved surface which descends in the axial direction of the piston from the inner circumferential edge of the annular flat part, and reaches the deepest part of the cavity, dispenser painting is not adopted thereto, but spray painting which has a wide range of selection of the application (spraying) pattern is adopted, and therefore, applying more easily the heat shield material efficiently and uniformly. Furthermore, since spray painting is performed after dispenser painting, it is easier to make the heat shield layer by spray painting connect from the heat shield layer by dispenser painting.

The crown surface may have a cavity in a center part, a part around the cavity may be an annular flat part, and a bulged part may be provided in a center part of the cavity. The method may further include the steps of, for the annular flat part and the bulged part, forming a portion of the heat shield layer as a discharge direction of the heat shield material is oriented in the axial direction of the piston, by the dispenser, and then, spraying the heat shield material on a part between the annular flat part and the bulged part by a paint spray gun to form the heat shield layer over the portion of the heat shield layer of the annular flat part and the bulged part.

According to this configuration, since dispenser painting is adopted for the annular flat part around the cavity and the bulged part in the center part of the cavity with the discharge direction of the heat shield material being oriented in the axial direction of the piston, the heat shield material can be applied efficiently. Further, since dispenser painting is limited to the annular flat part and the center bulged part of the cavity, and spray painting is limited to the inner surface of the cavity between the annular flat part and the bulged part, it becomes easier to avoid the scattering of the heat shield material by spray painting around the crown surface. Further, although the cavity inner circumferential surface is a curved surface which descends in the axial direction of the piston from the inner circumferential edge of the annular flat part, and reaches the deepest part of the cavity, dispenser painting is not adopted thereto, but spray painting which has a wide range of selection of the application (spraying) pattern is adopted, and therefore, it becomes easier to efficiently apply the heat shield material uniformly. Furthermore, since spray painting is performed after dispenser painting, it is easier to make the heat shield layer by spray painting continuous with the heat shield layer by dispenser painting.

A viscosity of the heat shield material discharged from the paint spray gun may be lower than a viscosity of the heat shield material discharged from the dispenser.

Since the heat shield material by spray painting tends to spread due to its low viscosity, omission of the application at a boundary between the dispenser painting part and the spray painting part is more easily prevented.

DETAILED DESCRIPTION OF THE DISCLOSURE

Hereinafter, one embodiment for implementing the present disclosure is described with reference to the accompanying drawings. The following description of the desirable embodiment is merely illustration essentially, and it is not intended to limit the present disclosure, its application, or its use.

Figure 1:
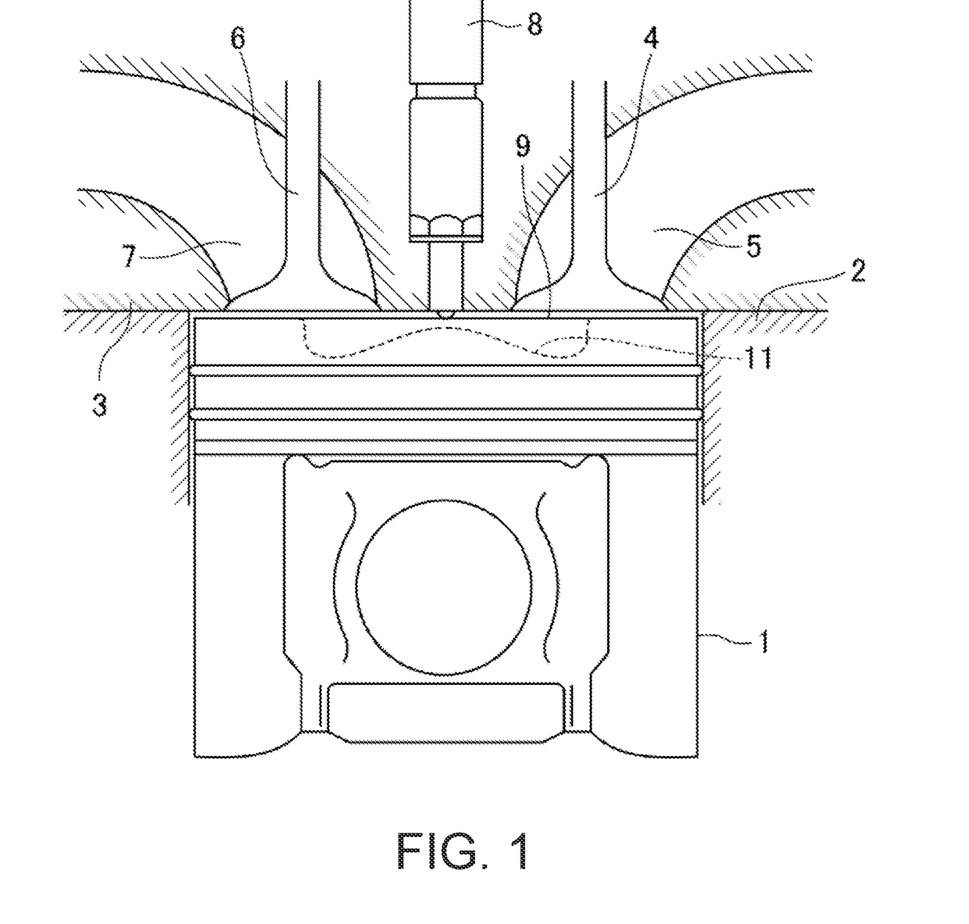
FIG. 1 is a cross-sectional view of an engine to which the present disclosure is applied.

In FIG. 1, a diesel engine includes a piston 1 made of aluminum alloy, a cylinder block 2, a cylinder head 3, an intake valve 4 which opens and closes an intake port 5 of the cylinder head 3, an exhaust valve 6 which opens and closes an exhaust port 7, and a fuel injection valve 8. A combustion chamber of the engine is formed by a crown surface 9 of the piston 1, the cylinder block 2, the cylinder head 3, and front surfaces of umbrella parts of the intake and exhaust valves 4 and 6 (a surface facing the combustion chamber).

Figure 2:
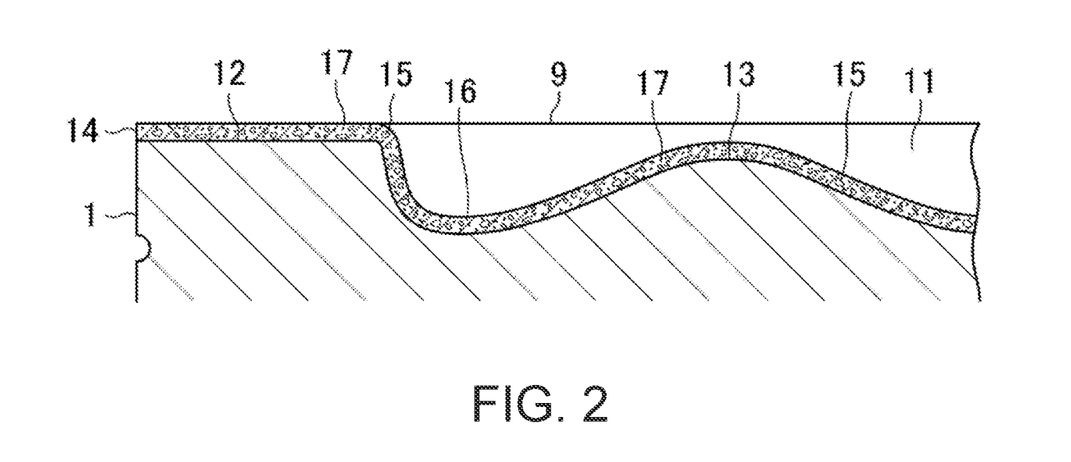
FIG. 2 is a cross-sectional view illustrating a heat shield layer of a crown surface of a piston of the engine.

As illustrated in FIG. 2, the crown surface 9 of the piston 1 has a cavity 11 which formed in a center part of the crown surface 9. The cavity 11 is dented in the piston axial direction, and a part around the cavity 11 is an annular flat part 12. A bulged part 13 is formed at the center of the cavity 11. A heat shield layer 14 is formed in the crown surface 9 of the piston 1 which is comprised of an inner surface of the cavity 11 including the bulged part 13, and the annular flat part 12.

The heat shield layer 14 includes a large number of hollow particles 15 made of inorganic oxide or ceramics, and a silicone-based resin binder 16 which fixes the hollow particles 15 to the piston 1, and fills spaces between the hollow particles 15 to form a base material (matrix) of the heat shield layer 14. Nanoparticles 17 are dispersed in the resin binder 16. In FIG. 2, the nanoparticles 17 are expressed as dots.

The thickness of the heat shield layer 14 may be, for example, 20 μm or more and 150 μm or less, and preferably 30 μm or more and 100 μm or less, and more preferably 50 μm or more and 70 μm or less. As the hollow particles 15, those having a particle diameter of μm order which is smaller than the thickness of the heat shield layer 14 may be used. The average particle diameter may preferably be 30 μm or less, for example. For example, hollow particles having the average particle diameter of 10 μm or less, preferably 3 μm or more and 5 μm or less may be adopted.

The average particle diameter of the nanoparticles 17 may preferably be 500 nm or less, more preferably 1 nm or more and 200 nm or less, and more preferably 1 nm or more and 120 nm or less. Note that the numerical value ranges described above are desirable ranges, and are not considered to be restrictive.

As the hollow particles 15, inorganic hollow particles may be adopted, and, for example, ceramic based hollow particles containing Si based oxide components (e.g., silica) or an aluminum-based oxide component (e.g., alumina), such as glass balloons, glass bubbles, fly ash balloons, Shirasu balloons, silica balloons, and aluminosilicate balloons, may preferably be adopted. A hollow ratio of the hollow particles may preferably be 60% by volume or higher, and more preferably 70% by volume or higher.

As the resin binder 16, for example, silicone-based resin made of three-dimensional polymer with a high degree of branch which is represented by methyl silicone-based resin and methylphenyl silicone-based resin may preferably be used. One concrete example of the silicone-based resin is polyalkylphenylsiloxane, for example.

As the nanoparticles 17, inorganic nanoparticles made of inorganic compounds, such as zirconia, alumina, silica, and titania, or metal nanoparticles, such as, Ti, and Zr, and Al, may be adopted, and particularly, silica nanoparticles modified by phenyl group on the surface may preferably be adopted. The nanoparticles may be hollow or solid.

The blending quantity of the nanoparticles 17 (a ratio of the nanoparticles 17 with respect to the total amount of the resin binder 16 and the nanoparticles 17 after the heat shield layer is calcinated) may preferably be 10% by volume or higher and 55% by volume or lower. The blending quantity of the hollow particles 15 (a ratio of the hollow particles 15 contained in the heat shield layer 14 after the calcination) may be adjusted according to the thermal insulation performance required for the heat shield layer 14. The blending quantity of the hollow particles 15 may be 30% by volume or higher and 60% by volume or lower, for example. The blending quantity may more preferably be 40% by volume or higher and 55% by volume or lower.

<Formation of Heat Shield Layer>

The heat shield layer 14 is formed by preparing heat shield material containing the hollow particles 15, the resin binder 16, the nanoparticles 17, and solvent, applying the heat shield material with respect to the crown surface 9 of the piston 1, and drying and calcinating the heat shield material. Upon the preparation of the heat shield material, a reactant silicone-based resin solution for the binder is first obtained by adding solvent, such as toluene, in a raw resin solution. The nanoparticles are added to the reactant silicone-based resin solution and agitated, and the hollow particles are further added and agitated, thereby obtaining liquid heat shield material for being applied to the crown surface 9 of the piston 1. The calcination after the application of the heat shield material may be performed by heating the piston 1 to which the heat shield material is applied at the temperature of about 100-200° C. for several minutes to several hours.

<Heat Shield Material Application Device>

Figure 3:
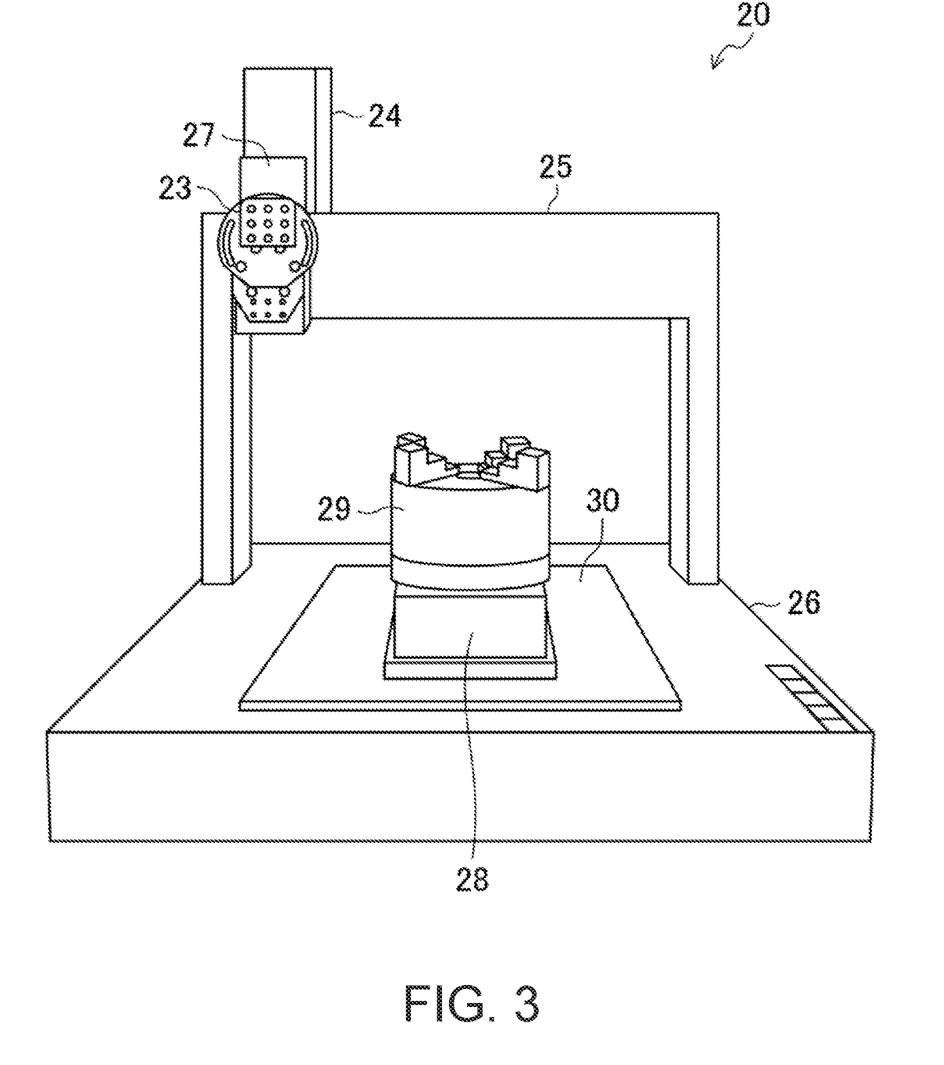
FIG. 3 is a perspective view illustrating a robot for applying heat shield material to the piston crown surface.

For the application of the heat shield material with respect to the crown surface 9 of the piston 1, a robot 20 illustrated in FIG. 3 is used. That is, a paint dot gun (dispenser or dropper) 21 illustrated in FIG. 4 or a paint spray gun 22 illustrated in FIG. 5 is attached to the robot 20 to apply the heat shield material.

As illustrated in FIG. 3, the robot 20 includes a robot head 24 which supports the paint dot gun 21 or the paint spray gun 22, a horizontal displacement device 25 which moves the robot head 24 horizontally, a mount 26 which supports the horizontal displacement device 25 with supports, and a robot controller (not illustrated). The robot head 24 is provided with a vertical displacement device 27 which raises and lowers a gun mounting jig 23 vertically. Thus, the gun mounting jig 23 are horizontally movable by the horizontal displacement device 25 and vertically movable by the vertical displacement device 27. The gun mounting jig 23 is provided to the vertical displacement device 27 so that it is rotatable on a horizontal axis perpendicular to the horizontal displacement direction.

A support table 30 is provided to the mount 26 so as to be movable in a horizontal direction which is perpendicular to the horizontal displacement direction, and a turning device 28 is supported by the support table 30. A piston mount 29 which supports the piston 1 so that its axial center becomes vertical is attached to the turning device 28. The turning device 28 rotates the piston 1 attached to the piston mount 29 on the axial center.

Figure 4:
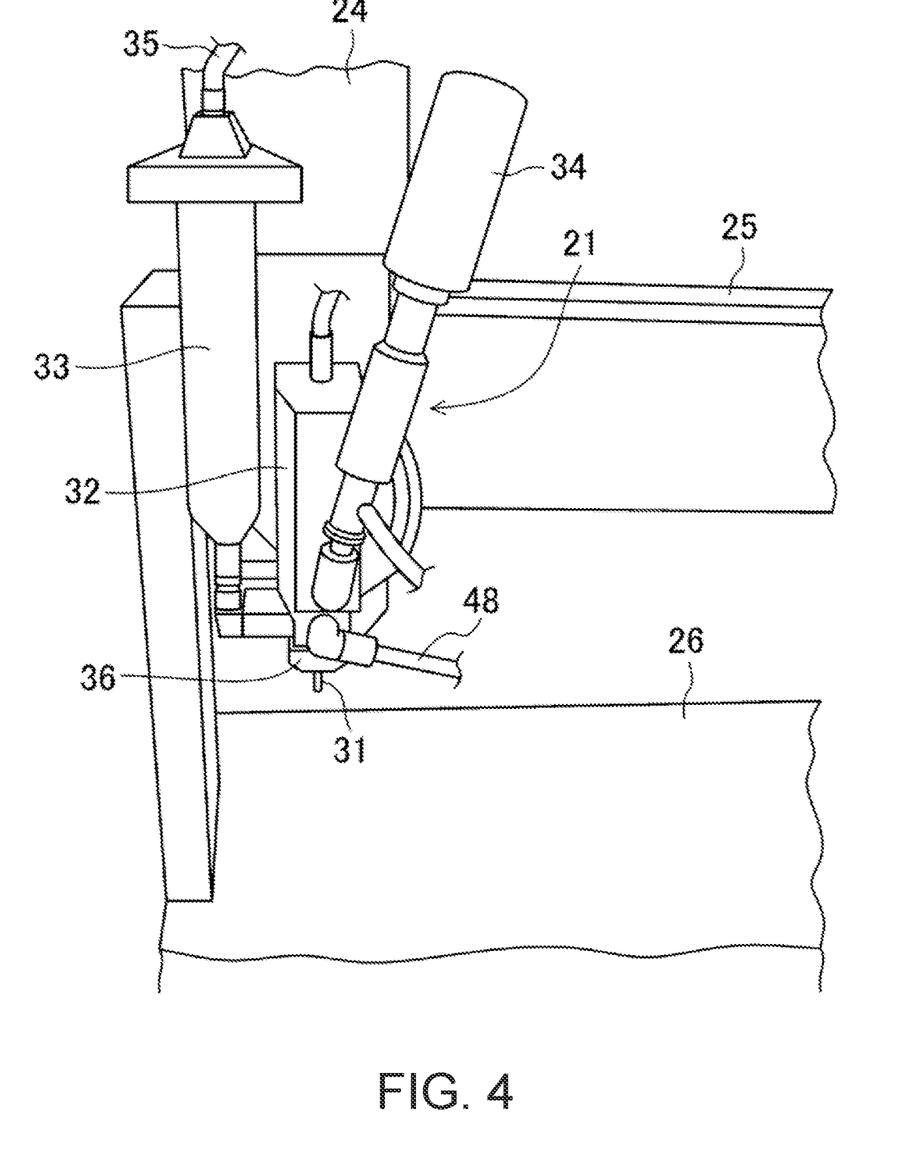
FIG. 4 is a perspective view illustrating a dispenser (paint dot gun) attached to the robot.
Figure 5:
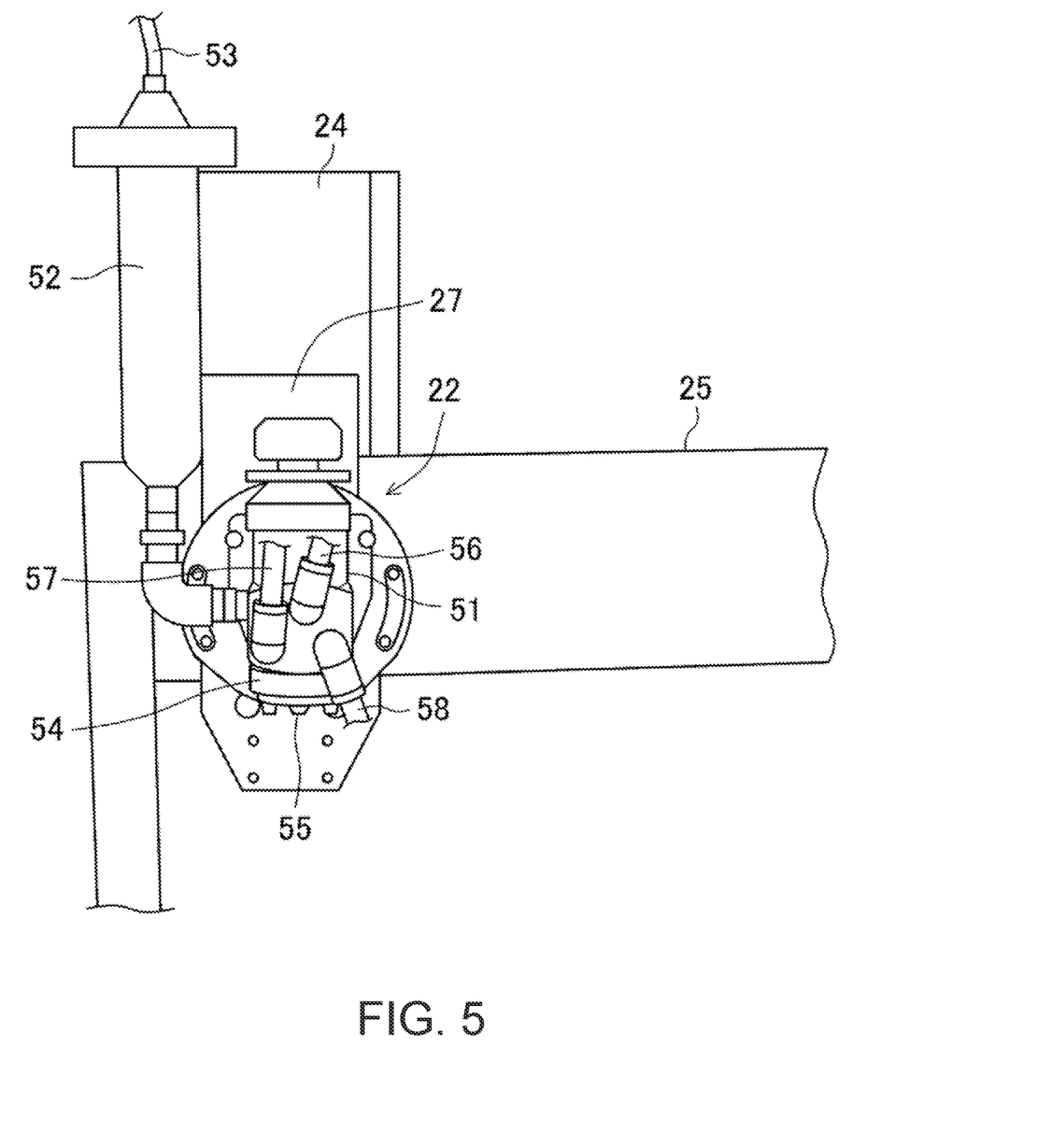
FIG. 5 is a front view illustrating a paint spray gun attached to the robot.

As illustrated in FIG. 4, the paint dot gun 21 includes a discharge head 32 having a nozzle 31 which discharges the heat shield material, and a syringe 33 and a silencer 34 which store the heat shield material. The syringe 33 and the silencer 34 are connected to the discharge head 32. A pressurized air source for pressurizing the heat shield material inside the syringe 33 is connected to an upper end of the syringe 33 via a hose 35. A heater 36 which heats the heat shield material to be discharged is provided to a tip-end part of the discharge head 32.

Figure 6:
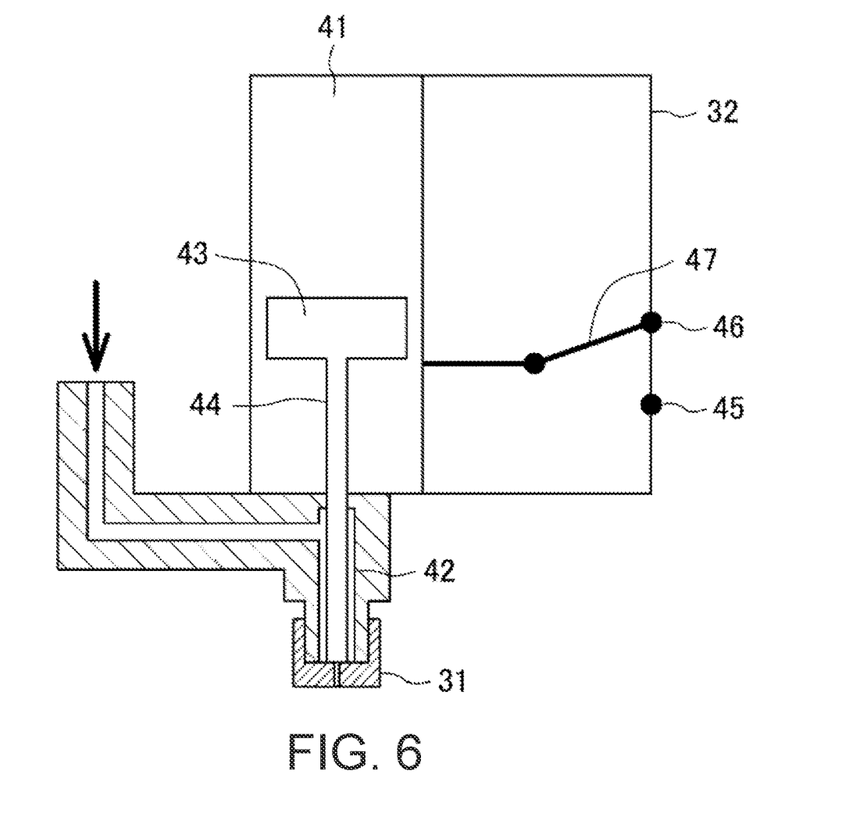
FIG. 6 is a view illustrating a configuration of a discharge head of the dispenser.

As illustrated in FIG. 6, the discharge head 32 of the paint dot gun 21 is provided with a plunger chamber 41 and a heat shield material chamber 42 which are partitioned in the vertical direction. A plunger rod 44 provided to a plunger 43 of the plunger chamber 41 is inserted into the heat shield material chamber 42. An air supply port 45 and an exhaust port 46 are provided to a front chamber forward of the maximum forward position of the plunger 43 in the plunger chamber 41. The pressurized air source is connected to the air supply port 45 via an air supply hose 48 illustrated in FIG. 4. A valve 47 switches the connection to the front chamber between the air supply port 45 and the exhaust port 46. The heat shield material is pumped from the syringe 33 to the heat shield material chamber 42.

In the paint dot gun 21, by switching the connection to the front chamber of plunger chamber 41 between the air supply port 45 and the exhaust port 46, the plunger 43 reciprocates so that the heat shield material is discharged from the discharge hole of the nozzle 31 in a dot (droplet) state. The paint dot gun 21 of this embodiment is a seating type which forms the dot (droplet) by contacting a valve seat on the heat shield material chamber 42 side so that the plunger rod 44 closes the discharge hole of the nozzle 31. Note that it may be a non-seating type.

As illustrated in FIG. 5, the paint spray gun 22 includes a discharge head 51 which discharges the heat shield material, and a syringe 52 which stores the heat shield material to be sent to the discharge head 51. A pressurized air source for pressurizing the heat shield material inside the syringe 52 is connected to an upper end of the syringe 52 via a hose 53. The discharge head 51 is provided therein with a heat shield material nozzle and a needle valve which opens and closes this nozzle. An air cap 54 is provided to a tip-end part of the discharge head 51, and the air cap 54 is provided with a heat shield material discharge part 55. The discharge head 51 is connected to an operation air supply hose 56, an atomized air supply hose 57, and a pattern air supply hose 58 which operate the needle valve.

In the paint spray gun 22, the heat shield material supplied from the syringe 52 by the rearward movement of the needle valve is discharged from the nozzle, and this heat shield material is atomized by the atomized air, and is formed in a suitable pattern by the pattern air. Then, this heat shield material is discharged from the discharge part 55 of the air cap 54.

<Application of Heat Shield Material to Piston Crown Surface>

Figure 7:
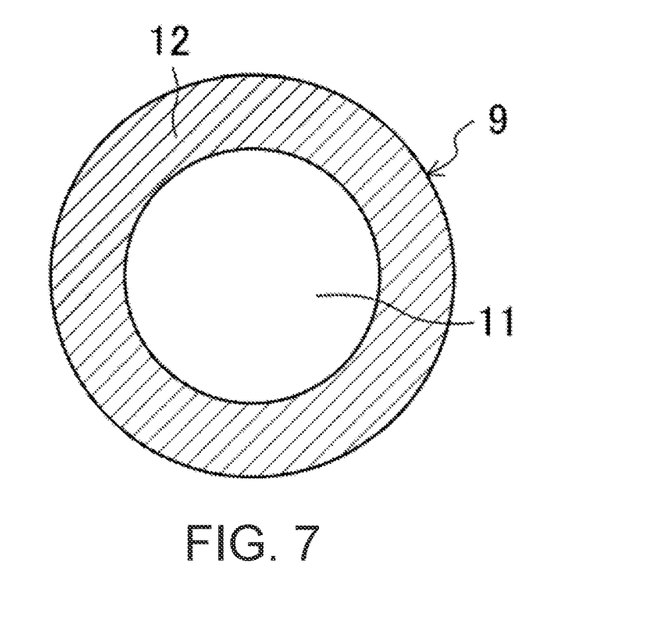
FIG. 7 is a plan view illustrating a division between a part of the piston crown surface where dot painting is performed, and a part where spray painting is performed.

According to one application aspect, the heat shield material is applied to the annular flat part 12 (the hatched part in FIG. 7) of the crown surface 9 illustrated in FIG. 7 by dispenser painting (that is, in this embodiment, by the dot painting of the paint dot gun 21), and the heat shield material is then applied to the cavity inner surface (the white part in FIG. 7) of the crown surface 9 by the spray painting of the paint spray gun 22.

Figure 8:
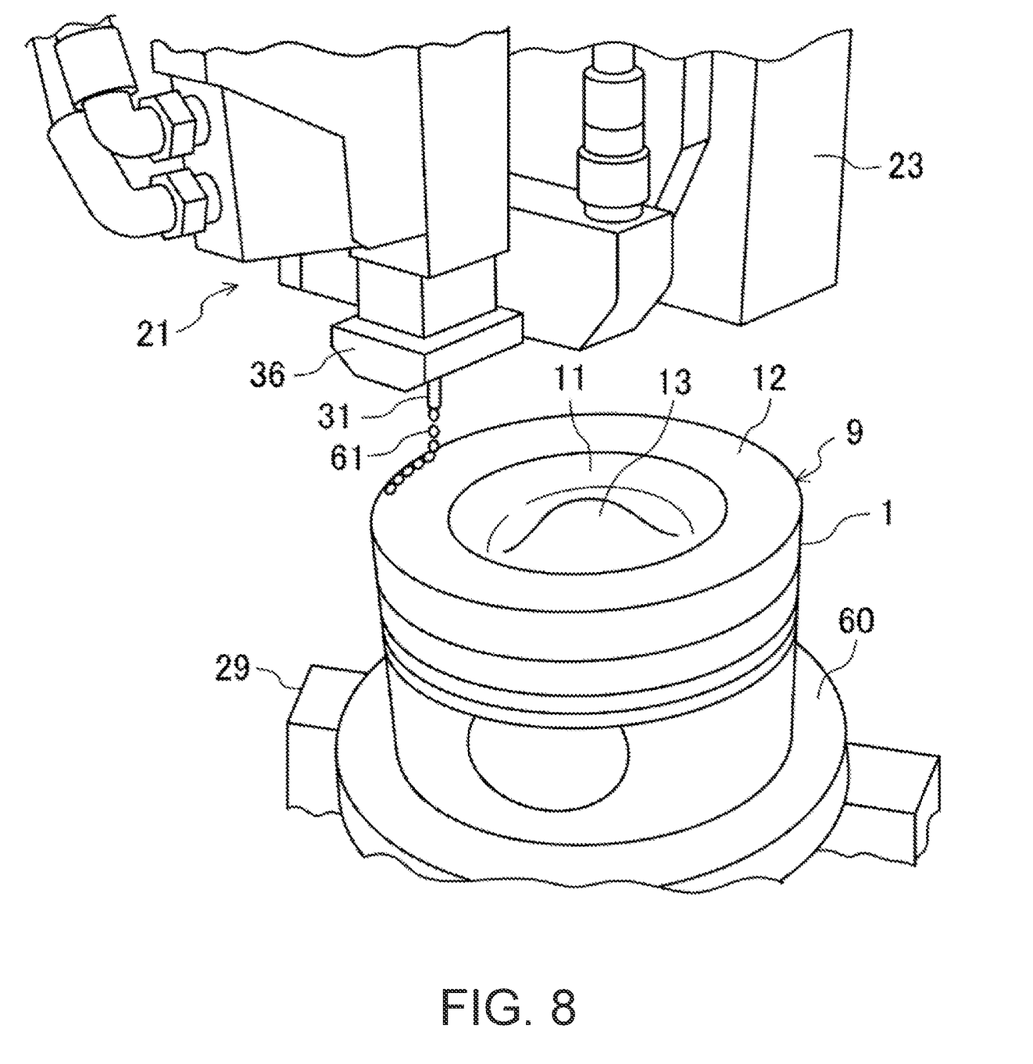
FIG. 8 is a perspective view illustrating a situation of painting of the piston crown surface by the paint dot gun.

By attaching the paint dot gun 21 to the gun mounting jig 23 of the robot 20 illustrated in FIG. 3, and operating the horizontal displacement device 25 and the vertical displacement device 27 and the support table 30 moves horizontally, as illustrated in FIG. 8, the nozzle 31 of the paint dot gun 21 is oriented vertically, toward an outer circumferential edge part of the annular flat part 12 of the crown surface 9. That is, the paint dot gun 21 is positioned so that the applied position of the heat shield material becomes the outer circumferential edge part of the annular flat part 12. The piston 1 is supported by the piston mount 29 via a support ring 60.

Then, the paint dot gun 21 is operated, while rotating the piston 1 on the axial center by the turning device 28, to discharge the heat shield material from the nozzle 31 in a linear fashion (a dot-line manner) and apply it to the annular flat part 12. By the rotation of the piston 1, the applied position of the heat shield material to the annular flat part 12 moves in the circumferential direction of the annular flat part 12. Dots of the heat shield material 61 sequentially applied onto the annular flat part 12 are spread and connected with each other, and therefore, a heat shield layer which continues in the circumferential direction of the annular flat part 12 is formed.

Each time the piston 1 completes a revolution, the paint dot gun 21 is moved radially inward of the piston 1 by a given amount (a distance corresponding to a width of the heat shield layer which is formed by the applied position of the heat shield material moving in the circumferential direction of the annular flat part 12). Thus, as the applied position of the heat shield material to the annular flat part 12 sequentially moves radially inward of the piston 1, the heat shield layer which spreads in the radial direction is formed. When the heat shield material is applied up to an inner circumferential edge part of the annular flat part 12, the painting by the paint dot gun 21 is stopped.

In the dot painting described above, unlike spray painting, since the heat shield material goes straight in the droplet manner toward the piston crown surface, without spreading from the paint gun, the heat shield material scattering around the crown surface is avoided. Therefore, application efficiency of the heat shield material improves. Further, masking of the side surface of the piston can be simplified or the masking becomes unnecessary, which becomes advantageous to the improvement in productivity. Moreover, upon moving the applied position of the heat shield material in the circumferential direction of the annular flat part 12, since the piston 1 is rotated while the position of the paint dot gun 21 is fixed, the straightness of the heat shield material which is discharged from the nozzle 31 will not be disturbed. Therefore, it becomes easier to form the heat shield layer with an equal thickness over the entire circumference of the annular flat part 12.

Hereinafter, although it is not intended to limit the present disclosure, the requirements of dot painting are now described. In order to avoid liquid dripping from the nozzle 31, the viscosity of the heat shield material discharged from the paint dot gun 21 may preferably be 0.20 dPa·s or higher and more preferably 0.30 dPa·s or higher, and in order to have the dots of the heat shield material 61 be spread and connected with each other on the crown surface 9, it may preferably be 0.80 dPa·s or lower. In order to make the membrane formation appropriate, the temperature of the heat shield material may preferably be 10° C. or higher, and in order to avoid pre-curing due to volatilization of the solvent or catalytic reaction, it may preferably be 50° C. or lower. If a clearance between the tip end of the nozzle 31 and the annular flat part 12 is 1 mm or more and 10 mm or less, it is easier to apply the heat shield material to the expected applied position.

A discharge amount of the heat shield material per shot (an amount of one dot of the heat shield material) may preferably be about 0.4 mg or more and about 1.5 mg or less, for example. The rotational speed of the piston 1 may preferably be, by the turning angle, 40°/s or faster and 550°/s or slower, and the discharge frequency may preferably be 10 Hz or higher and 400 Hz or lower.

Here, the application pitch of the dots of the heat shield material 61 in the circumferential direction of the annular flat part 12 depends on the rotational speed of the piston 1 and the discharge frequency. When the application pitch is too short, adjacent dots of the heat shield material 61 increasingly overlap with each other, the application state becomes unstable, and the heat shield layer becomes thick. On the other hand, when the application pitch is too long, the interval between adjacent dots of the heat shield material 61 becomes wide, and the connection of the dots due to spreading fails. Further, as the discharge amount increases, the adjacent dots of the heat shield material 61 more easily overlap with each other.

Therefore, it may be preferable that the discharge amount is set constant, and the optimal application pitch is set according to the rotational speed and the discharge frequency so that the linear heat shield layer, which is continuous and less in the disorder in the circumferential direction by the movement of the applied position of the heat shield material in the circumferential direction, is formed.

The annular flat part 12 becomes shorter in the circumference of the part to which the heat shield material is applied as the applied position of the heat shield material moves toward the inner circumferential edge from the outer circumferential edge of the annular flat part 12. Therefore, in order to fix the application pitch of the heat shield material in each radial part of the annular flat part 12, the discharge amount and the discharge frequency are set constant, and the rotational speed of the piston 1 is reduced as the applied position of the heat shield material moves radially inward. Alternatively, while the discharge amount and the rotational speed of the piston 1 are set constant, the application pitch is fixed by reducing the discharge frequency as the applied position of the heat shield material moves radially inward. Because the discharge amount and the application pitch become fixed, the heat shield layer with an equal thickness over the entire annular flat part 12 can be formed.

Figure 9:
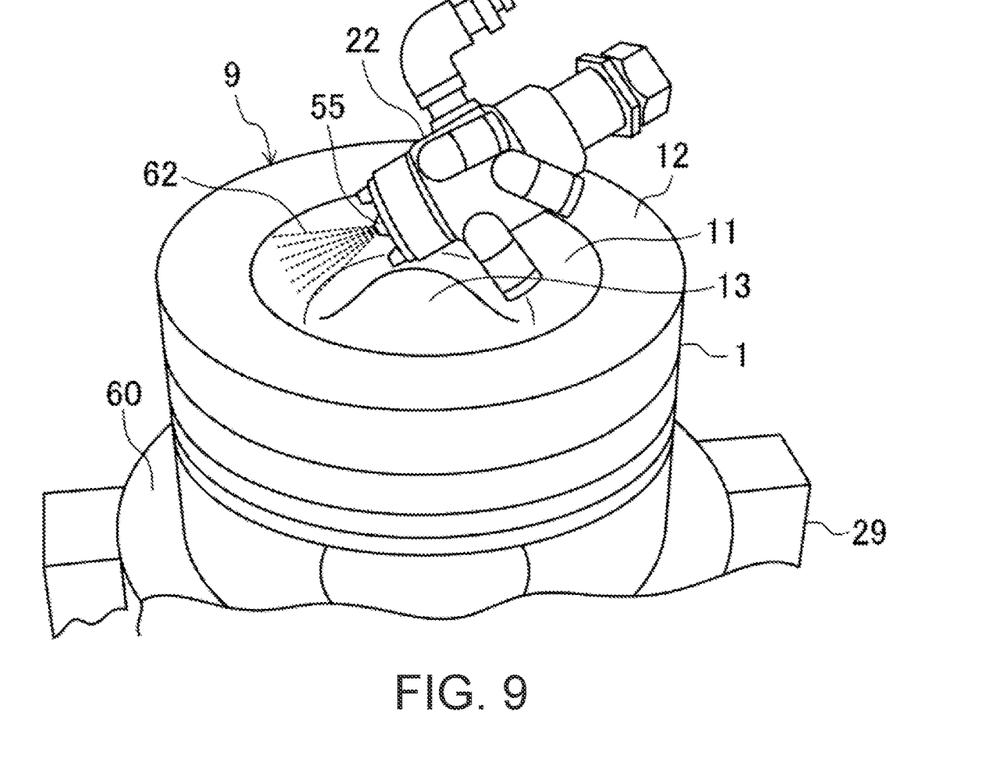
FIG. 9 is a perspective view illustrating a situation of painting of the piston crown surface by the paint spray gun.

After dot painting of the annular flat part 12, spray painting is performed for the inner surface of the cavity 11 of the crown surface 9. That is, by attaching the paint spray gun 22 to the gun mounting jig 23 of the robot 20 illustrated in FIG. 3, operating the horizontal displacement device 25 and the vertical displacement device 27, and moving the support table 30 horizontally, the discharge part 55 of the paint spray gun 22 is oriented toward the inner circumferential surface of the cavity 11 of the crown surface 9, as illustrated in FIG. 9.

Then, while rotating the piston 1 supported by the piston mount 29 on the axial center by the turning device 28, the paint spray gun 22 is operated to spray the heat shield material from the discharge part 55. Since the piston 1 rotates, the heat shield material is applied to the entire inner circumferential surface of the cavity 11. Then, by moving the sprayed position of the heat shield material from the inner circumferential surface of the cavity 11 toward the bulged part 13 by the operation of the robot 20, the heat shield material is applied to the entire inner surface of the cavity 11. Therefore, the heat shield layer which continues to the heat shield layer of the annular flat part 12 can be formed on the inner surface of the cavity 11.

Since the application of spray painting is limited to the inner surface of the cavity 11, scattering of the heat shield material around the crown surface from the spray painting is more easily avoided. Further, although the cavity inner circumferential surface is the curved surface which descends in the axial direction of the piston 1 from the inner circumferential edge of the annular flat part 12, and reaches the deepest part of the cavity 11, dispenser painting is not adopted thereto, but spray painting which has a wide range of selectable application (spraying) patterns is adopted, and thus, it becomes easier to efficiently apply the heat shield material uniformly. Further, since spray painting is performed after dot painting, it is easier to make the heat shield layer by spray painting continuous with the heat shield layer by dot painting.

Below, although it is not intended to limit the present disclosure, the parameters of spray painting are described. In order to make the heat shield material from fine dots (as a result, a membrane is formed), the viscosity of the heat shield material may preferably be 0.20 dPa·s or higher and 0.40 dPa·s or lower. Although the viscosity of the heat shield material in dot painting may preferably be set higher in order to prevent the liquid dripping as described previously, the viscosity of the heat shield material in spray painting may preferably be lower than the viscosity of the heat shield material in dot painting. Therefore, since the heat shield material is more easily spread, the omission of the application at a boundary between the dot painting part and the spray painting part is more easily prevented.

The discharge amount of the heat shield material in spray painting may preferably be 30 mg/s or more and 300 mg/s or less, and the temperature of the heat shield material may preferably be 10° C. or higher and 40° C. or lower. The rotational speed of the piston 1 may preferably be 200°/s or faster and 550°/s or slower, and the gun moving speed may preferably be 50 mm/s or faster and 200 mm/s or slower. Further, the gun distance from the discharge part of the paint spray gun 22 to the application surface may preferably be 10 mm or more and 200 mm or less.

Figure 10:
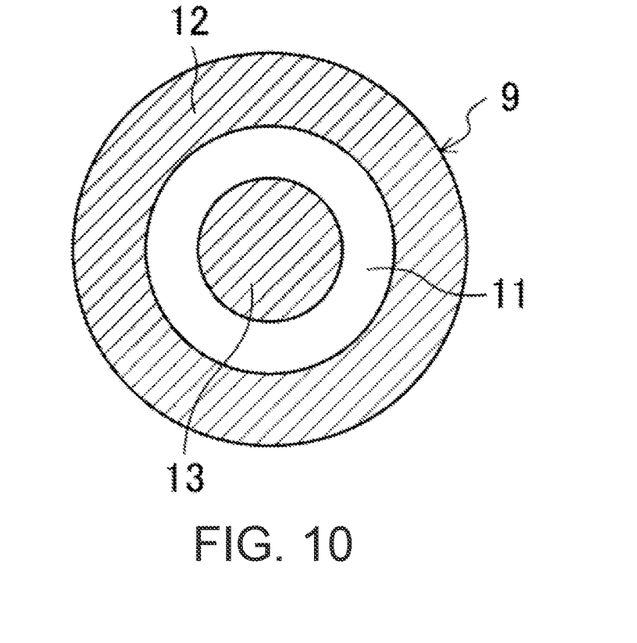
FIG. 10 is a plan view illustrating another example of the division between the part of the piston crown surface where dot painting is performed, and the part where spray painting is performed.

Although according to the application method of the above embodiment, spray painting is performed on the entire inner surface of the cavity 11, dispenser painting may be adopted to the bulged part 13 in the cavity 11. That is, as illustrated in FIG. 10, for the annular flat part 12 and the bulged part 13 (the hatched part in FIG. 10), the heat shield layer may be formed while the discharge direction of the heat shield material is oriented in the axial direction of the piston by the dispenser (in the above embodiment, the paint dot gun 21). Then, the heat shield material may be sprayed by the paint spray gun 22 to the part from the cavity inner circumferential surface between the annular flat part 12 and the bulged part 13 to the base of the bulged part 13 (the white part in FIG. 10), and the heat shield layer may be formed over the heat shield layer of the annular flat part 12 and the heat shield layer of the bulged part 13.

Although in the above embodiment the paint dot gun 21 has one nozzle 31, the paint dot gun may have a plurality of nozzles. The plurality of nozzles may be provided parallelly in the circumferential direction of the annular flat part 12, or may be provided parallelly in the radial direction of the piston 1. When the plurality of nozzles are provided parallelly in the radial direction, if the discharge amounts of these nozzles are the same, the discharge frequencies of the radially-inward nozzles are reduced in order to equalize the thickness of the heat shield layer. On the other hand, if the discharge frequencies of these nozzles are the same, the discharge amounts of the radially-inward nozzles are reduced.

Further, although in the above embodiment the paint dot gun is adopted as the dispenser, the dispenser may be a continuous discharge type, such as a screw type, which continuously discharges the heat shield material from the nozzle (discharges in a continuous-line manner).

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Piston
9 Crown Surface
11 Cavity
12 Annular Flat Part
13 Bulged Part
14 Heat Shield Layer
20 Robot
21 Paint Dot Gun (Dispenser)
22 Paint Spray Gun
28 Turning Device
61 Dot of Heat Shield Material

What is claimed is:

1. A method of applying a heat shield material to form a heat shield layer on a crown surface of a piston of an engine, comprising the steps of:
    disposing a dispenser that linearly discharges the heat shield material toward the crown surface; and
    moving an applied position of the heat shield material with respect to the crown surface in a circumferential direction of the crown surface, while discharging the heat shield material from the dispenser toward the crown surface,
    wherein the dispenser is a paint dot gun that discharges dots of the heat shield material at a given interval, and
    wherein the dots of the heat shield material spread and become continuous from each other in the circumferential direction of the crown surface.

2. The method of claim 1, wherein the moving the applied position of the heat shield material comprises fixing the position of the dispenser and rotating the piston on an axial center thereof.

3. The method of claim 2, further comprising the step of, each time the applied position of the heat shield material moves in the circumferential direction around the top of the crown surface at least once, moving the applied position of the heat shield material with respect to the crown surface in the radial direction of the piston to form the heat shield layer on the crown surface, continuously in the radial direction.

4. The method of claim 3, further comprising the steps of:
positioning the dispenser so that the applied position of the heat shield material with respect to the crown surface is in a circumferential edge part of the crown surface;
in this state, rotating the piston on the axial center thereof and starting the discharge of the heat shield material; and
each time the piston completes a full rotation, moving the applied position of the heat shield material inwardly in the radial direction by a given amount.

5. The method of claim 4, wherein a discharge amount and a discharge frequency of the paint dot gun per shot are set constant, and a rotational speed of the piston is reduced as the applied position of the heat shield material moves inwardly in the radial direction.

6. The method of claim 4, wherein a discharge amount of the paint dot gun per shot and a rotational speed of the piston are set constant, and a discharge frequency of the paint dot gun is reduced as the applied position of the heat shield material moves inwardly in the radial direction.

7. The method of claim 6, wherein the crown surface has a cavity in a center part, and a part around the cavity is an annular flat part, the method further comprising the steps of:
for the annular flat part, forming the heat shield layer as a discharge direction of the heat shield material is oriented in the axial direction of the piston, by the dispenser; and
then spraying the heat shield material on an inner surface of the cavity by a paint spray gun to form the heat shield layer continuous from the annular flat part.

8. The method of claim 7, wherein a viscosity of the heat shield material discharged from the paint spray gun is lower than a viscosity of the heat shield material discharged from the dispenser.

9. The method of claim 6, wherein the crown surface has a cavity in a center part, a part around the cavity is an annular flat part, and a bulged part is provided in a center part of the cavity, the method further comprising the steps of:
for the annular flat part and the bulged part, forming a portion of the heat shield layer as a discharge direction of the heat shield material is oriented in the axial direction of the piston, by the dispenser; and
then spraying the heat shield material on a part between the annular flat part and the bulged part by a paint spray gun to form the heat shield layer over the portion of the heat shield layer of the annular flat part and the bulged part.

10. The method of claim 9, wherein a viscosity of the heat shield material discharged from the paint spray gun is lower than a viscosity of the heat shield material discharged from the dispenser.

11. The method of claim 3, wherein the crown surface has a cavity in a center part, and a part around the cavity is an annular flat part, the method further comprising the steps of:
for the annular flat part, forming the heat shield layer on the annular flat part by the dispenser such that a discharge direction of the heat shield material is oriented in the axial direction of the piston; and
then spraying the heat shield material on an inner surface of the cavity by a paint spray gun to form the heat shield layer continuous from the annular flat part.

12. The method of claim 3, wherein the crown surface has a cavity in a center part, a part around the cavity is an annular flat part, and a bulged part is provided in a center part of the cavity, the method further comprising the steps of:
for the annular flat part and the bulged part, forming a portion of the heat shield layer on the annular flat part by the dispenser such that a discharge direction of the heat shield material is oriented in the axial direction of the piston; and
then spraying the heat shield material on a part between the annular flat part and the bulged part by a paint spray gun to form the heat shield layer over the portion of the heat shield layer of the annular flat part and the bulged part.

13. The method of claim 2, wherein the crown surface has a cavity in a center part, and a part around the cavity is an annular flat part, the method further comprising the steps of:
for the annular flat part, forming the heat shield layer on the annular flat part by the dispenser such that a discharge direction of the heat shield material is oriented in the axial direction of the piston; and
then spraying the heat shield material on an inner surface of the cavity by a paint spray gun to form the heat shield layer continuous from the annular flat part.

14. The method of claim 2, wherein the crown surface has a cavity in a center part, a part around the cavity is an annular flat part, and a bulged part is provided in a center part of the cavity, the method further comprising the steps of:
for the annular flat part and the bulged part, forming a portion of the heat shield layer on the annular flat part by the dispenser such that a discharge direction of the heat shield material is oriented in the axial direction of the piston; and
then spraying the heat shield material on a part between the annular flat part and the bulged part by a paint spray gun to form the heat shield layer over the portion of the heat shield layer of the annular flat part and the bulged part.

15. The method of claim 1, wherein the crown surface has a cavity in a center part, and a part around the cavity is an annular flat part, the method further comprising the steps of:
for the annular flat part, forming the heat shield layer on the annular flat part by the dispenser such that a discharge direction of the heat shield material is oriented in the axial direction of the piston; and
then spraying the heat shield material on an inner surface of the cavity by a paint spray gun to form the heat shield layer continuous from the annular flat part.

16. The method of claim 1, wherein the crown surface has a cavity in a center part, a part around the cavity is an annular flat part, and a bulged part is provided in a center part of the cavity, the method further comprising the steps of:
for the annular flat part and the bulged part, forming a portion of the heat shield layer on the annular flat part by the dispenser such that a discharge direction of the heat shield material is oriented in the axial direction of the piston; and
then spraying the heat shield material on a part between the annular flat part and the bulged part by a paint spray gun to form the heat shield layer over the portion of the heat shield layer of the annular flat part and the bulged part.

* * * * *